United States Patent [19]

Sidenstick

[11] 4,197,443
[45] Apr. 8, 1980

[54] METHOD AND APPARATUS FOR FORMING DIFFUSED COOLING HOLES IN AN AIRFOIL

[75] Inventor: James E. Sidenstick, Cincinnati, Ohio

[73] Assignee: General Electric Company, Cincinnati, Ohio

[21] Appl. No.: 834,746

[22] Filed: Sep. 19, 1977

[51] Int. Cl.² .............................................. B23P 1/12
[52] U.S. Cl. ................... 219/69 E; 219/69 M
[58] Field of Search ................ 219/69 E, 69 R, 69 M; 204/129.1, 129.55, 280, 288, 289, 224 M

[56] References Cited

U.S. PATENT DOCUMENTS

| 2,901,588 | 8/1959 | McKeilnie | 291/69 G |
| 3,271,848 | 9/1966 | Moutandon | 219/69 E |
| 3,527,543 | 9/1970 | Howald | 416/90 |
| 3,814,893 | 6/1974 | Helms et al. | 219/69 E |
| 3,894,925 | 7/1975 | Inoue | 219/69 E |

FOREIGN PATENT DOCUMENTS 506480  3/1976  U.S.S.R. .................. 219/69 E

*Primary Examiner*—Bruce A. Reynolds
*Assistant Examiner*—Clifford C. Shaw
*Attorney, Agent, or Firm*—Dana F. Bigelow; Derek P. Lawrence

[57] ABSTRACT

The electrode of an electrodischarge machining apparatus has a plurality of teeth which are substantially laterally tapered to increasing width toward the machine-held base end. Further, the plane of the tapered portions is inclined to that of the free end portions, which precede the tapered portions in application to the airfoil surface to be machined. As the tapered and inclined portions are inserted into the airfoil surface, a plurality of holes are formed which are diffused in both lateral directions and in one longitudinal direction to thereby provide a diffused hole with improved film cooling effectiveness.

10 Claims, 10 Drawing Figures

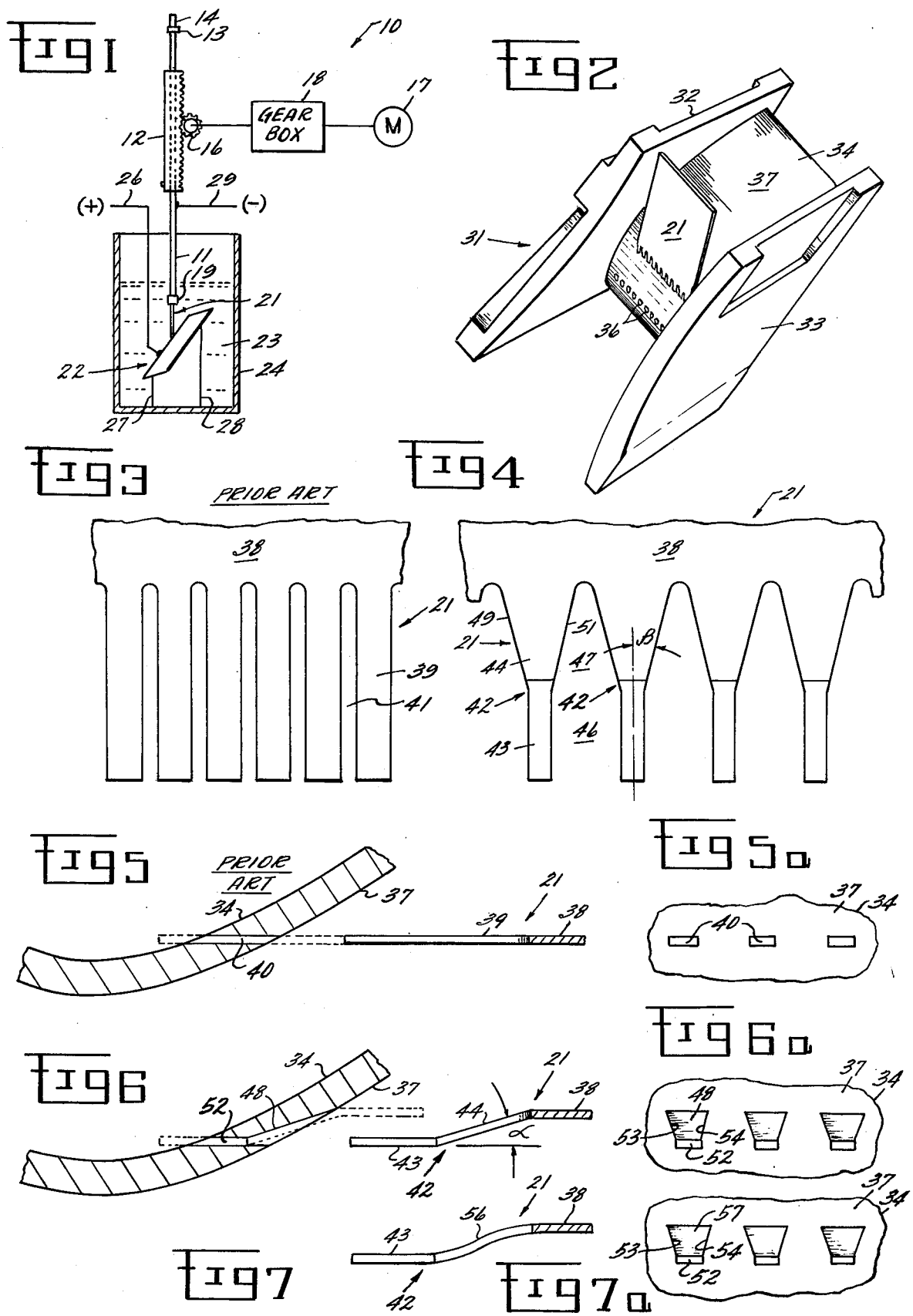

METHOD AND APPARATUS FOR FORMING DIFFUSED COOLING HOLES IN AN AIRFOIL

BACKGROUND OF THE INVENTION

This invention relates generally to gas turbine engines and, more particularly, to an improved method and apparatus for forming film cooling holes in the turbine airfoils of a gas turbine engine.

In order to permit turbine nozzle guide vanes and rotor blades to operate at the extremely high gas stream temperatures which are desirable for increased efficiency, it is necessary to cool the hollow airfoil with the use of high pressure cooling air from the compressor. One of the most effective modes, and least demanding of cooling air volume, is that of film cooling wherein a layer of cooling air is maintained between the high temperature gases and the external surfaces of the turbine blades and vanes. The layer of cooling air is formed by directing airflow from within the airfoil through a series of small holes which are formed in the airfoil in the desired pattern. The resulting film of air which flows over the airfoil surface tends to reduce peak metal temperatures and temperature gradients to thereby make the use of higher turbine inlet temperature ranges possible, which in turn increases the engine efficiency.

It has been found that film cooling effectiveness with reduced amounts of cooling air use can be obtained by the use of "diffusion" film holes, wherein the discharge side of the gill hole is tapered to an increased opening size by an angle of up to 7° from the axis of the hole. However, even though this phenomenon has been recognized for its performance advantages, the forming of such diffusion gill holes has been relatively expensive and poor in quality. Various methods devised for this purpose include the practice of introducing a dwell time in an electrostream drilling operation, a multiple pass process using the electrochemical machining (ECM) or electrodischarge machining (EDM) process and a laser drilling process with multlple discharges of energy. Electrostream with dwell is achieved by having the instrument pause at a particular point on its path of movement toward the workpiece to be drilled so as to thereby erode a diffused area at the exit end of the gill hole. Such a practice is effective but prohibitively expensive. In the case of electro-discharge machining, which is a primary process for putting film holes in nozzle vanes and bands, there has been no cost effective way of providing for these diffusion film holes. A multiple pass process forms the straight portion of the hole with one process step and forms the diffuser portion with a separate process step. This adds costs and presents quality problems because the two portions of the film hole tend to misalign and spoil the desired smooth diffusion of the cooling fluid.

Another method, wherein three-dimensionally shaped electrodes are used for each individual hole, is considered prohibitively expensive.

It is, therefore, an object of the present invention to provide an improved method and apparatus for foming diffused film holes in an airfoil.

Another object of the present invention is the provision for an economical and effective method of forming diffusion film holes in an airfoil.

Yet another object of the present invention is the provision for forming diffusion film holes in a workpiece by way of an improved electro-discharge machining method and apparatus.

These objects and other features and advantages become more readily apparent upon reference to the following description when taken in conjuction with the appended drawings.

SUMMARY OF THE INVENTION

Briefly, in accordance with one aspect of the invention, the electrode of an electrodischarge machine apparatus is formed such that the "comb" teeth have a tapered portion intermediate their free ends and the machine-held base end which increases in width toward the base end so as to provide a beveled surface in the lateral sides of the hole formed in the workpiece. Such a "diffusion" film hole exhibits increased airflow and heat transfer performance.

By yet another aspect of the invention, the tapered portion of the "comb" teeth are inclined at an angle to the plane of the free end portions of the teeth so that when the electrode is inserted into the workpiece, an increased erosion occurs at the exit end of the gill hole thereby providing a bevel or diffusion in the longitudinal plane. By selective inclination of the beveled portion to accommodate the curvature of the airfoil at a point where the hole is drilled, the desired diffusion angle can be obtained.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a schematic illustration of an electrodischarge machining apparatus for use with the present invention;

FIG. 2 is a perspective view of a turbine vane with an electro-discharge machine electrode in accordance with the present invention;

FIG. 3 is a fragmented view of the comb portion of an electro-discharge machining electrode of the prior art;

FIG. 4 is the comb portion of an electrodischarge machining electrode in accordance with the preferred embodiment of the present invention;

FIGS. 5 and 5a show a fragmented side sectional view of the prior art electrode as applied to the workpiece and the resulting cooling holes;

FIGS. 6 and 6a show a fragmented side sectional view of the electrode as applied to the workpiece, and the resulting cooling holes, all in accordance with the preferred embodiment of the invention; and FIGS. 7 and 7(a) show a side elevational view of the electrode and the resulting holes in accordance with the modified embodiment of the invention.

DESCRIPTION OF THE PREFERRED EMBODIMENT

Referring now to FIG. 1, the invention is shown generally at 10 as applied to typical electrodischarge machining apparatus including a hollow electrode tool holder 11 which extends through a rack 12 and is interconnected by means of an adapter 13 with a tube 14 to provide coolant thereto. The teeth of the rack 12 are meshed with a gear 16 which is driven in either direction of rotation by the motor 17 through the reduction gearbox 18. A chuck 19 acts to removably fasten a disposable electrode 21 to the tool holder 11. Situated below the electrode 21 in spaced relationship is a workpiece 22 from which it is desired to erode material by the discharge of current from the electrode 21 to the workpiece 22. Surrounding the workpiece is a coolant 23 which is contained in a tank 24. The workpiece 22 is electrically connected by lead 26 to a positive terminal and to the tank 24 by supports 27 and 28. The hollow electrode tool holder 11 is electrically connected by lead 29 to a negative terminal of a DC power source. Rotation of the motor advances the rack to move the electrode 21 toward the workpiece 22. When the electrode reaches a position such that the dielectric of the gap therebetween is broken down by an erosive electrical intermittent discharge thereacross, particles of material are removed from the workpiece. Further pulsating discharges continue to erode material until a hole is formed all the way through or until the electrode 21 is withdrawn from the proximity of the workpiece. A more detailed description of the electrodischarge machining process and apparatus can be obtained by reference to U.S. Pat. No. 2,901,588, issued to I. C. McKechnie on Aug. 25, 1959, and incorporated herein by reference.

Referring now to FIG. 2, a typical workkpiece for application of the above-described electrodischarge machine process is shown to comprise a turbine vane 31 having outer and inner bands 32 and 33, respectively, supporting a nozzle airfoil 34 rigidly interconnected therebetween. Such a turbine vane 31 comprises one of a plurality of vanes which are disposed in adjacent circumferential relationship in a conventional manner. Formed in the vane outer band 32 is an opening (not shown) which provides fluid ommunication between a cooling air source and the internal cavities of the hollow airfoil 34. This pressurized cooling air acts to cool the inner surfaces of the airfoil by way of convection and/or impingement cooling processes, and acts to cool the outer surfaces of the airfoil by the film cooling process. Film cooling is facilitated by a plurality of gill holes 36 formed in the suction side 37 of the airfoil 34 for receiving the cooling air from the internal cavities thereof and allowing them to flow along the surface of the airfoil to provide insulation from the hot gases adjacent thereto in a manner well known in the art. In addition to the gill holes on the suction side of the vane as shown, there may also be holes formed in the nose of the nozzle airfoil 34 and gill holes formed in the pressure side thereof. For any of these holes, it may be desirable to have the exhaust side of the holes formed in a beveled-out or diffused manner so as to facilitate the flow of cooling air. In particular, the diffusion holes are desirable on the suction side 37 of the airfoil where a high pressure ratio condition exists during operation and where the phenomenon of flow diffusion helps to promote adherence of the cooling air to the airfoil surface where it is most effective in achieving metal surface cooling.

As can be seen in FIG. 2, the gill holes 36 are disposed in spaced radial relationship in two rows near the leading edge of the vane. Although various distribution patterns may be used to obtain the desired cooling performance, such a uniform row distribution is generally attractive in performance and particularly attractive for manufacturing purposes since one row can be formed by a single application of an electrodischarge machining electrode 21 as shown in FIG. 2.

The structure of the electrode 21 as embodied in the prior art is shown in FIG. 3. It consists of a flat plate-like structure having a body 38 and a plurality of elongate, transversely spaced teeth 39 extending longitudinally therefrom. The teeth are of equal width throughout their length, and in cooperation define alternate transverse gaps 41 therebetween. When applied to the electrodischarge machine process, such a conventional electrode will form a row of holes each having uniform width equal to the width of the teeth 39, and being spaced at a uniform distance equal to the width of the gap 41. If advancement of the electrode toward the workpiece is along the axes of the teeth 39, as is generally the case, then the resulting hole diameters will be uniform throughout the thickness of the workpiece. That is, there will be no diffusion hole as contemplated by the present invention.

Referring now to FIG. 4, the electrode 21 is shown in accordance with the preferred embodiment of the present invention to include a body 38 and a plurality of transversely spaced teeth 42. Each of the teeth 42 has a free end portion 43 of substantially equal width throughout its longitudinal length, and a base portion 44 which tapers upwardlly in transverse width from the free end portion 43 to the body 38 with which it interconnects. In turn, the spaces defined by adjacent teeth are a uniform width space 46 between the free end portions 43, and a substantially triangularly shaped space 47 between the base portions thereof.

As so far described, the electrode 21 can be manufactured by the consecutive steps of forming a substantially rectangular plate of a copper alloy or other suitable electrical conducting material, and stamping out the spaces 46 and 47 between the teeth 42. Application of such an electrode to the electrodischarge machining process would result in a hole which was diffused in the transverse directions only. In order to bring about a diffusion in the longitudinal plane as is desired, and preferably on the downstream side of the hole, it is necessary to form an additional step in the manufacturing process. The additional step required is that of bending the individual teeth to a profile as shown in FIG. 6 wherein the base portion 43 forms an angle $\alpha$ with the longitudinal axis of the free end portion 43. The electrode body 38 may remain in the same plane as the base 44 or may be bent so as to be in parallel alignment with the electrode free end 43 as is shown in FIG. 6 and as preferred for convenience of application. The angle $\alpha$ may be varied as desired for the particular application to produce the diffusion of cooling air in the finished airfoil. In general, the diffusion angle should not exceed 7° which has been shown empirically to be the practical limit for good flow diffusion performance. Experience has shown that diffusion holes of angles greater than 7° tend to cause cavitation in the airflow. Similarly, in the transverse direction the base portion 44 of the teeth are beveled at angles $\beta$ from the longitudinal axes of the free end 43 as desired up to an angle of 7° (see FIG. 4).

Referring now to FIGS. 5, 5a, 6 and 6a, the resulting holes from use of the conventional electrode are compared with the resulting holes from the use of the present inventive electrode 21. As can be seen in FIGS. 5 and 5a, the resulting conventional holes 40 are uniform in diameter throughout their length, including the discharge end thereof. However, with use of the present electrode as inserted into the workpiece to the extent shown by the dotted lines, a beveled surface 48 results on the downstream side of the hole so as to present a diffusion in one direction of the longitudinal plane. Similarly, the beveled sides 49 and 51 of the teeth base 44 cause a transverse diffusion on both sides of the hole. The resulting holes are as shown in FIG. 6a and comprise a smaller elongate hole 52 projecting through most of the wall of the airfoil 34, and the beveled surfaces 48 on the longitudinal side and 53 and 54 on the transverse sides.

Referring now to FIG. 7, a modified embodiment of the electrode 21 is shown wherein the electrode free end 43 and body 38 are interconnected by a curved base portion 56. The resulting surface 57 on the downstream discharge end of the hole will be curved accordingly to present a more gradual diffusion phenomenon as desired. It will, of course, be understood that the base surfaces 49 and 51 may be gradually curved instead of planar in form as shown in FIG. 4 to bring about a similar curved surface on the transverse sides 53 and 54 of the hole. The shape of the cooling holes resulting from application of the electrode with the curved base portion 56 is shown in FIG. 7(a).

It will be understood that while the present invention has been described in terms of preferred and modified embodiments, it may take on any number of other forms while remaining within the scope and intent of the invention.

Having thus described the invention, what is considered novel and desired to be secured by Letters Patent of the United States is:

I claim:

1. An improved electrode of the type having a body for installation in an electric discharge machine apparatus and at least one tooth for placement in close proximity to a workpiece to form a gap across which an electric charge may be transmitted to erode a portion of the workpiece, wherein the improvement comprises a tooth having a straight longitudinally extending end portion and a base portion interconnecting said end portion to the body, said base portion having a beveled surface which is disposed at an angle to the axis of the longitudinally extending end portion, such that when said tooth is advanced longitudinally toward and into the workpiece said beveled surface causes an erosion which results in a hole which is diffused at its one end and further, wherein said tooth is longitudinally nonplanar in form.

2. An improved electrode as set forth in claim 1 wherein said angle is between 0 and 7 degrees.

3. An improved electrode as set forth in claim 1 wherein said base portion is frustotriangular in longitudinal cross section so as to present a pair of beveled surfaces which, when applied to the workpiece, result in diffusions on opposite sides of the hole.

4. An improved electrode as set forth in claim 1 wherein said base portion forms, in the longitudinal plane, an angle with said end portion longitudinal axis.

5. An improved electrode as set forth in claim 4 wherein said angle is in the range of 0 to 7 degrees.

6. An improved electrode as set forth in claim 1 wherein said base portion is curved in its longitudinal profile to form a gradual transition from said end portion longitudinal axis.

7. An improved electrode of the type having a body for installation in an electric discharge machining apparatus for transmitting an electrical charge across the gap to a workpiece to form a hole therein comprising: at least one tooth having a free end and a base, the base being in part substantially tapered outwardly toward the electrode body to which it attaches, such that when the electrode is applied to a workpiece the resulting hole is diffused at its one end by said tapered base and wherein said tooth is longitudinally nonplanar in form.

8. An improved electrode as set forth in claim 7 wherein said at least one tooth has its free end in one plane and its base in another plane.

9. An improved electrode as set forth in claim 7 wherein said at least one tooth is curved in form such that when it is applied to a curved workpiece a diffused hole results.

10. An improved method of forming holes in a workpiece by way of electrodischarge machining, comprising the steps of:

(a) attaching to an electrodischarge machining apparatus an electrode having a body and at least one tooth attached to said body, said tooth having a frustotriangular portion with its base adjacent said body, and being longitudinally nonplanar in form; and (b) applying said electrode to a workpiece until said tooth pierces said workpiece and said frustotriangular portion penetrates its surface to form a hole which is diffused at its one end.

* * * * *